United States Patent Office 3,123,537
Patented Mar. 3, 1964

3,123,537
PROCESS FOR PRODUCING GLUTAMIC ACID BY FERMENTATION
Guido M. Miescher, Terre Haute, Ind., assignor to Commercial Solvents Corporation, New York, N.Y., a corporation of Maryland
No Drawing. Filed Jan. 25, 1963, Ser. No. 254,009
3 Claims. (Cl. 195—47)

The present invention relates to an improved process for the production of L-glutamic acid by the fermentation of nutrient fermentation media with the organism *Brevibacterium divaricatum*.

Previously, it has been shown that L-glutamic acid has been successfully prepared by fermentation utilizing the organism *Brevibacterium divaricatum*. In order to produce L-glutamic acid, this organism is provided with a carbohydrate source, a nitrogen source, a phosphate source, a potassium source and trace amounts of mineral salts. Yields are commonly increased to a satisfactory level by the further addition of a growth promoter and growth initiator.

It is known from the literature and my own experience that *Brevibacterium divaricatum* grows best in a temperature range of about 28° C. to 33° C. At lower, as well as higher temperatures, growth of the organism is retarded. Consequently, the whole fermentation process is commonly conducted within the aforementioned temperature range.

It has now been discovered that unexpectedly improved L-glutamic acid yields and improved sugar to glutamic acid conversion rates can be obtained in a shorter time by utilizing the commonly employed temperature conditions of about 28° C. to 33° C. during the growth phase of the fermentation process until the organism has reached essentially maximum growth and then conducting the remainder of the fermentation process, i.e. the L-glutamic acid production phase wherein little or no growth takes place at a temperature of about 36° to 40° C. The improved results are particularly surprising since conducting the whole fermentation, say at 39° C., for example, produces no appreciable amounts of L-glutamic acid.

The new process of the present invention comprises incubating glutamic acid-producing strains of the organism *Brevibacterium divaricatum*, such as NRRL B–2311, NRRL B–2312 and NRRL B–2620 (all of which have been deposited with the Northern Regional Research Laboratories of the United States Department of Agriculture), in an aqueous nutrient medium containing the carbohydrate, nitrogen, phosphate, etc., sources and a growth promoter. The incubation or growth phase of the fermentation is carried out as aforementioned, at temperatures ranging from about 28° to 33° C., preferably about 30 to 33° C., and a pH of about 6 to 8.5, preferably about 7.5–8.0, under submerged conditions of agitation and aeration. During this initial phase of the fermentation the organism multiplies rapidly until maximum growth is attained. Maximum growth can be determined by actually filtering out and weighing the cells of the organism in a given amount of the medium at periodic intervals until no further increase in weight is obtained. A more convenient method of determining when maximum growth of the organism has been attained is to measure the optical density, generally from about 0.55 to 0.85, at a 1:50 dilution measured at 650$\mu\mu$, of the medium at periodic intervals after the fermentation has started. The optical density of the medium increases as the cell weight increases.

In accordance with the present invention, when the organism has reached maximum or essentially maximum growth the temperature of the fermentation is raised to about 36° to 40° C., preferably about 38° C., and the remainder of the fermentation conducted under these temperatures.

In practical operation, it is preferred to permit the initial or growth phase of the fermentation to continue until the rate of growth increase diminishes substantially since after a fast initial rate of growth, the growth of the organism slows and the absolute maximum is not attained for a substantial period of time. Generally, an initial growth period of about 12 to 20 hours is sufficient to permit multiplication of the cells of the organism in an amount near enough to the absolute maximum to effect the improvements of the present invention. After about 12 to 20 hours of growth the optical density is about 0.6 to 0.8 and the rate of increase thereafter is very slow.

Carbohydrates useful in the aqueous nutrient media of the invention include such materials as glucose, sucrose, maltose and fructose, or crude sugar-containing materials such as materials prepared by hydrolyzing starch-containing materials, molasses, etc. The nitrogen source present in the nutrient media can be in either organic or inorganic form and includes, for instance, nitrogen compounds such as urea, ammonium salts such as ammonium chloride, ammonium sulfate, ammonium tartrate, etc. The potassium and phosphate source is usually provided the nutrient media by a single compound such as dipotassium phosphate. Trace mineral sources included are those containing such elements as manganese, magnesium, iron, etc., in compounds such as magnesium sulfate, ferrous sulfate, manganese sulfate, etc. Suitable growth promoters utilized include biotin, desthiobiotin, peptone meat extracts, corn steep liquor, casein-hydrolysate, wheat-bran-extracts, and unsaturated fatty acids of 16 to 18 carbon atoms such as oleic, linoleic and linolenic acid. Desirable also is the presence of small amounts of a growth initiator such as caramelized glucose.

After preparation of L-glutamic acid by the fermentation process of the present invention, the glutamic acid can be recovered by any suitable means. One such means of recovery involves removing the cells from the fermentation medium by filtration or centrifuge, concentrating the resulting filtrate, adjusting the pH of the filtrate to about 3.2 by addition of acid and crystallizing the glutamic acid at reduced temperatures. Further purification can be accomplished by conventional means.

The following example is included to further illustrate the process of the present invention and demonstrate the advantages obtained therefrom.

EXAMPLE I

A fermentation medium was prepared containing the following:

| | | |
|---|---|---|
| Cerelose | 9% | 900 g. |
| Conc. Hydrol [1] | 0.4% | 40 g. |
| $KH_2PO_4$ | 0.1% | 10 g. |
| $K_2SO_4$ | 0.1% | 10 g. |
| $MgSO_4$ | 0.5% | 5 g. |
| $FeSO_4 \cdot 7H_2O$ | 12 p.p.m. | 120 mg. |
| $MnSO_4 \cdot 1H_2O$ | 6 p.p.m. | 60 mg. |
| Urea | 0.2% | 20 g. |
| Tap Water up to Volume | | 10 liters. |

[1] A source of caramelized sugar.

The pH of the medium was adjusted with ammonium hydroxide to pH 6.5 and the medium was heat-sterilized at 120° C. for 25 minutes. After cooling, the medium was transferred to a fermenter of 24 liters capacity and inoculated with 6% of the total fermentation volume of actively growing *Brevibacterium divaricatum* NRRL B–2620.

The pH was then adjusted to 8.0 and 5 ml. of oleic acid as a growth promoter were added. The fermentation was started under the following conditions:

32° C.
6 liters of air at 3 p.s.i.g.
650 r.p.m. agitation

The pH of the fermentation was controlled with ammonium hydroxide which was added whenever the pH of the fermentation dropped below 8.0. From 16 hours until 24 hours after the start of the fermentation, a concentrated cerelose solution was fed continuously to the fermenter to increase the total calculated amount of glucose in the fermentation medium, based on the final volume at the end of the fermentation, to 15%. The fermentation was carried out until the glutamic acid synthesis came to a standstill. The results are shown in Table I.

EXAMPLE II

The same fermentation medium as in Example I was prepared and the fermentation was carried out in the same way as Example I except for one change: 16 hours after the inoculation the temperature of the liquid was raised to 38° C. (by raising the temperature of the cooling water in the jacket of the fermenter), and was held at this temperature to the end of the fermentation. The results of this example are also shown in Table I.

*Table I*

|  | Glutamic Acid, g./liter | Sugar to Glutamic Acid Conversion, percent | Final Volume, liters |
|---|---|---|---|
| Ex. I: |  |  |  |
| 17 hours | 31 |  |  |
| 24 hours | 50 |  |  |
| Final, 33 hours | 62 | 41.6 | 11.4 |
| Ex. II: |  |  |  |
| 17 hours | 33 |  |  |
| 24 hours | 61 |  |  |
| Final, 28 hours | 69 | 47 | 11.6 |

The data of the table demonstrates that the fermentation process of Example II has been improved over the fermentation process of Example I in three ways:

(1) The fermentation has been accelerated markedly, thus shortening the whole fermentation cycle and allowing a more economic utilization of the fermentation equipment.

(2) More glutamic acid has been produced with the same amount of available sugar and consequently, (3) A higher sugar to acid conversion has been obtained.

It is claimed:

1. In the process for the production of L-glutamic acid by cultivating a L-glutamic acid producing strain of the organism *Brevibacterium divaricatum* in an aqueous nutrient medium containing a carbohydrate source, a phosphate source, a potassium source, a nitrogen source and a growth promoter, said medium being maintained at pH of about 6 to 8, the improvement which comprises conducting the fermentation at a temperature of about 28° to 33° C. until essentially maximum growth of the organism is obtained and then conducting the remainder of the fermentation at a temperature of about 36 to 40° C.

2. The process of claim 1 wherein the strain of *Brevibacterium divaricatum* is NRRL B–2620.

3. The process of claim 2 wherein the temperature employed after essentially maximum growth of the organism has been obtained is about 38° C.

No references cited.